United States Patent
Chen

(10) Patent No.: US 8,103,887 B2
(45) Date of Patent: Jan. 24, 2012

(54) POWER SUPPLY CONSUMING LOW ENERGY IN STANDBY CONDITIONS

(75) Inventor: Tsung-Chun Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 812 days.

(21) Appl. No.: 12/183,485

(22) Filed: Jul. 31, 2008

(65) Prior Publication Data
US 2010/0031068 A1   Feb. 4, 2010

(51) Int. Cl.
*G06F 1/32* (2006.01)
*G06F 1/00* (2006.01)
*H01H 9/54* (2006.01)

(52) U.S. Cl. ............ 713/320; 713/300; 307/140
(58) Field of Classification Search ............ 713/300
See application file for complete search history.

(56) References Cited

U.S. PATENT DOCUMENTS

| | | | | |
|---|---|---|---|---|
| 5,852,550 A * | 12/1998 | Majid et al. | ............ | 363/21.05 |
| 6,307,762 B1 * | 10/2001 | Shiobara | ............ | 363/69 |
| 6,316,844 B1 * | 11/2001 | Arima | ............ | 307/65 |
| 6,392,903 B2 * | 5/2002 | Mori et al. | ............ | 363/21.07 |
| 7,072,189 B2 * | 7/2006 | Kim et al. | ............ | 363/16 |
| 7,719,863 B2 * | 5/2010 | Yeh et al. | ............ | 363/49 |
| 7,843,088 B2 * | 11/2010 | Perper et al. | ............ | 307/140 |
| 7,863,774 B2 * | 1/2011 | Chen | ............ | 307/64 |
| 2003/0011247 A1 * | 1/2003 | Kajiwara et al. | ............ | 307/125 |

* cited by examiner

*Primary Examiner* — Suresh Suryawanshi
(74) *Attorney, Agent, or Firm* — Muncy, Geissler, Olds & Lowe, PLLC

(57) ABSTRACT

A power supply consuming low energy in standby conditions includes a primary power system activated by standby power, a standby power system, a remote start/stop signal source and a start triggering circuit. The remote start/stop signal source is triggered by users to generate a remote start/stop signal sent to the start triggering circuit to generate a start signal. The standby power system is connected to a control unit and generates the standby power according to an electric signal provided by the control unit. The control unit also determines time series of sending the electric signal to the standby power system according to time series of the start signal being generated. Thus a mechanism to start and stop the standby power system is formed.

5 Claims, 3 Drawing Sheets

POWER SUPPLY CONSUMING LOW ENERGY IN STANDBY CONDITIONS

FIELD OF THE INVENTION

The present invention relates to a power supply that consumes low energy in standby conditions and particularly to a circuit adopted for use on a power supply.

BACKGROUND OF THE INVENTION

Since the motherboard of computers has been changed from AT specifications to ATX specifications, the structure of power supply that provides electric power also is changed. One of the notable features is that output of the power supply is divided into primary output power and standby power that are supplied respectively by a primary power system and a standby power system of the power supply. The standby power system receives input power from an input power source and starts. The input power is converted to the standby power which is provided to form a sleeping mode in regular conditions. Such a state provides a remote start function required in the ATX specifications. When users push a start button or order the computer to start from a remote site, the standby power provides power to start the primary power system. Then the primary power system generates the primary output power to supply electronic equipments for operation. Referring to FIG. 1, a conventional power supply includes a rectification unit 1, a power factor correction unit 2, a primary power system 3 and a standby power system 4. The rectification unit 1 receives and rectifies input power 91, and the power factor correction unit 2 boosts the voltage and regulates the phase of the rectified power. On the other hand, the standby power system 4 is connected to a control unit 41 to receive at least one electric signal. The standby power system 4, according to parameters or power supplied by the electric signal, converts the input power 91 to standby power 94 which becomes the power source of the power supply and electronic equipments in standby conditions. A remote start/stop signal source 93 (such as a button depressed and triggered by users) is provided to generate a remote start/stop signal to activate the primary power system 3 to generate output power 92. Thus the standby power 94 provides the power needed to start the primary power system 3. The standby power system 4 also continuously generates the standby power 94 in the standby conditions. As a result, loss continuously takes place on the standby power system 4. The above-mentioned is a starting process of a conventional power supply. With the output watts of the power supply increased constantly, output watts of the standby power 94 also increase to such an extent almost capable to support a small electronic device, such as charging a handset inserted in a USB slot, running a small fan inserted in a USB slot or the like. Thus utilization of the standby power 94 is expanded. However, power loss of the standby power 94 also increases due to the greater output watts. When the primary power system 3 is shut down, the standby power system 4 continuously gets the input power and functions continuously. As the loss generated by the standby power system 4 is directly affected by its output, the more output delivered by the standby power system 4, the more unnecessary loss occurs in the standby conditions. This also results in a higher temperature of the equipment in the standby conditions. As the cooling fan usually is turned off when the primary power system 3 is shut down, cooling of the equipment in the standby conditions is adversely affected. There are still rooms for improvement.

SUMMARY OF THE INVENTION

In view of the problems occurred to the conventional power supply that generate loss on the standby power system during regular operation, and the loss increases as the output watts of the standby power system is enhanced, hence it is an object of the present invention to provide a circuit structure to reduce loss in standby conditions and also improve cooling of equipments in the standby conditions.

The present invention provides a power supply that consumes less energy in standby conditions. The power supply includes a primary power system activated by standby power, a standby power system, a remote start/stop signal source and a start triggering circuit. The remote start/stop signal source is triggered by users to generate a remote start/stop signal sent to the start triggering circuit to generate a start signal. The standby power system is connected to a control unit and generates the standby power according to an electric signal provided by the control unit. The control unit further determines time series of sending the electric signal to the standby power system according to time series of the start signal being generated. Thus a mechanism to start and stop the standby power system is formed. While the remote start/stop signal can still determine the start time series of the standby power system through the start triggering circuit, during the standby period the standby power system is being treated as a shut-down condition to reduce loss. The start triggering circuit does not convert or deliver power, hence during the standby period the start triggering circuit generates much lower loss than the standby power system. Therefore the object of the invention for reducing loss in the standby conditions can be accomplished.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
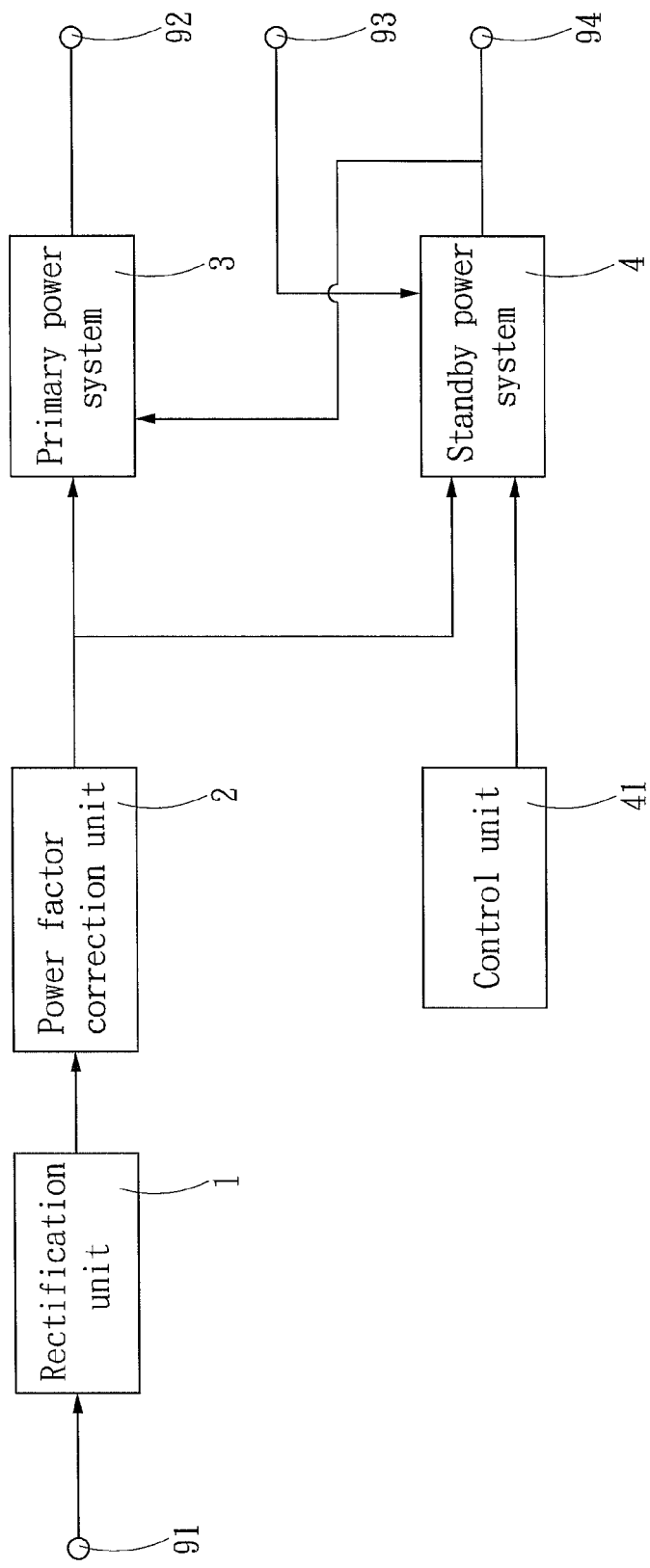
FIG. 1 is a structural block diagram of a conventional power supply.
Figure 2:
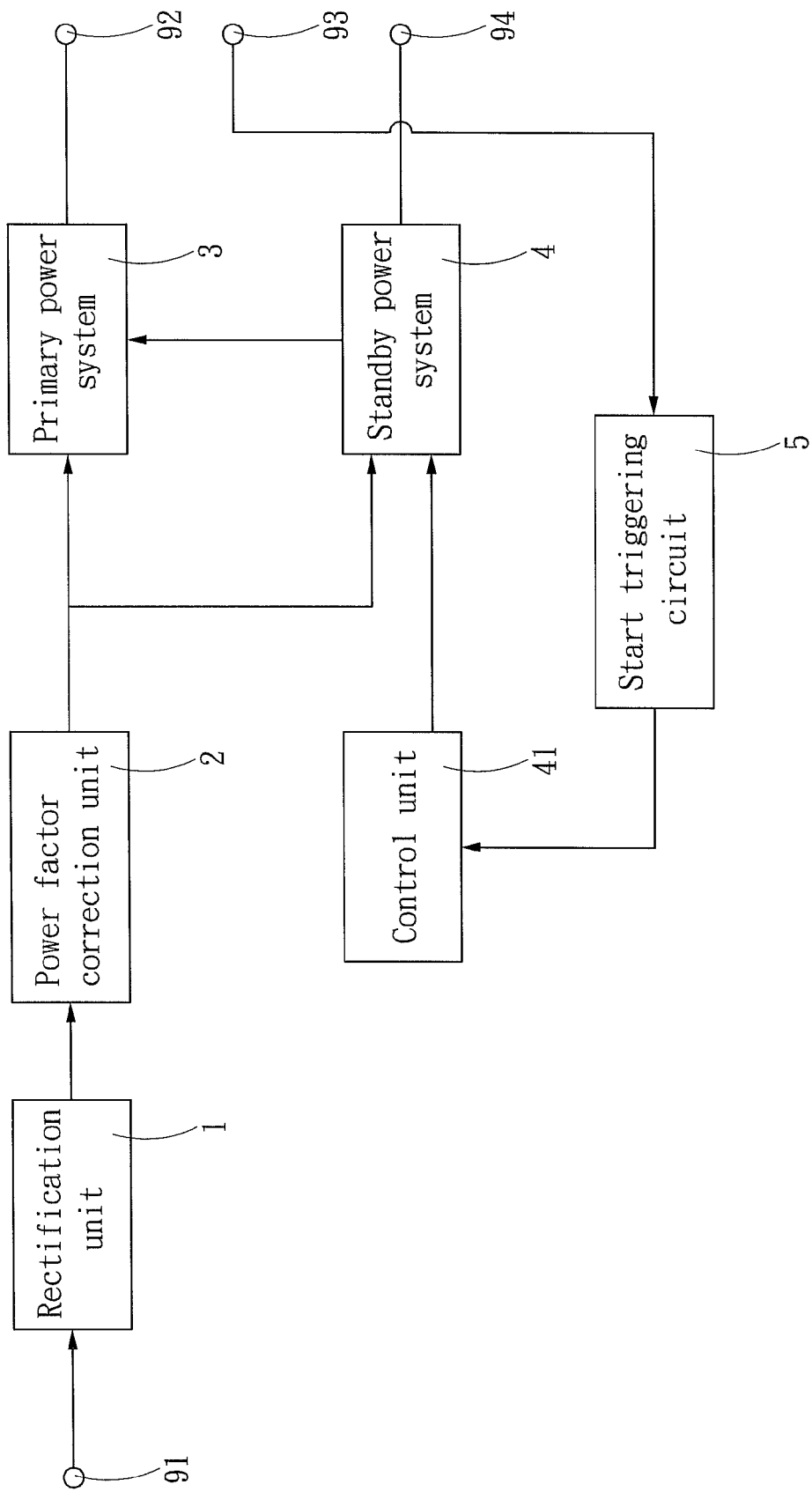
FIG. 2 is a circuit block diagram of the invention.

Please refer to FIG. 2 for the circuit structure of the power supply that consumes low energy in standby conditions according to the invention. The power supply includes a primary power system 3 and a standby power system 4, a rectification unit 1 and a power factor correction unit 2 that channel input power 91 to the primary power system 3 and the standby power system 4. The primary power system 3 is activated by standby power 94 supplied by the standby power system 4 to generate output power 92. The power supply further has a remote start/stop signal source 93 and a start triggering circuit 5. The standby power system 4 is connected to a control unit 41 which controls operation thereof. The control unit 41 provides an electric signal to drive the standby power system 4 to convert the input power 91 to the standby power 94 so that the power supply enters a standby condition.

The remote start/stop signal source 93 is a trigger switch depressible by users to generate a remote start/stop signal to direct the start triggering circuit 5. The start triggering circuit 5 generates a start signal according to the remote start/stop signal to drive the control unit 41 to generate the electric signal, thereby active the standby power system 4. In other words, the start triggering circuit 5 generates the start signal through the remote start/stop signal, and the start signal drives the control unit 41 to generate the electric signal and then order the standby power system 4 to operate and generate the standby power 94. Although the circuit mentioned above activates the standby power system 4 through the start triggering circuit 5, the start triggering circuit 5 does not convert or output electric power, hence it produces very little loss. Before the start triggering circuit 5 generating the start signal, the standby power system 4 can be treated as in a shutdown condition, hence also does not produce loss. Therefore the problem of generating loss continuously on the standby power system 4 after the power supply has received the input power 91 that occurs to the conventional power supply can be avoided in the invention.

Figure 3:
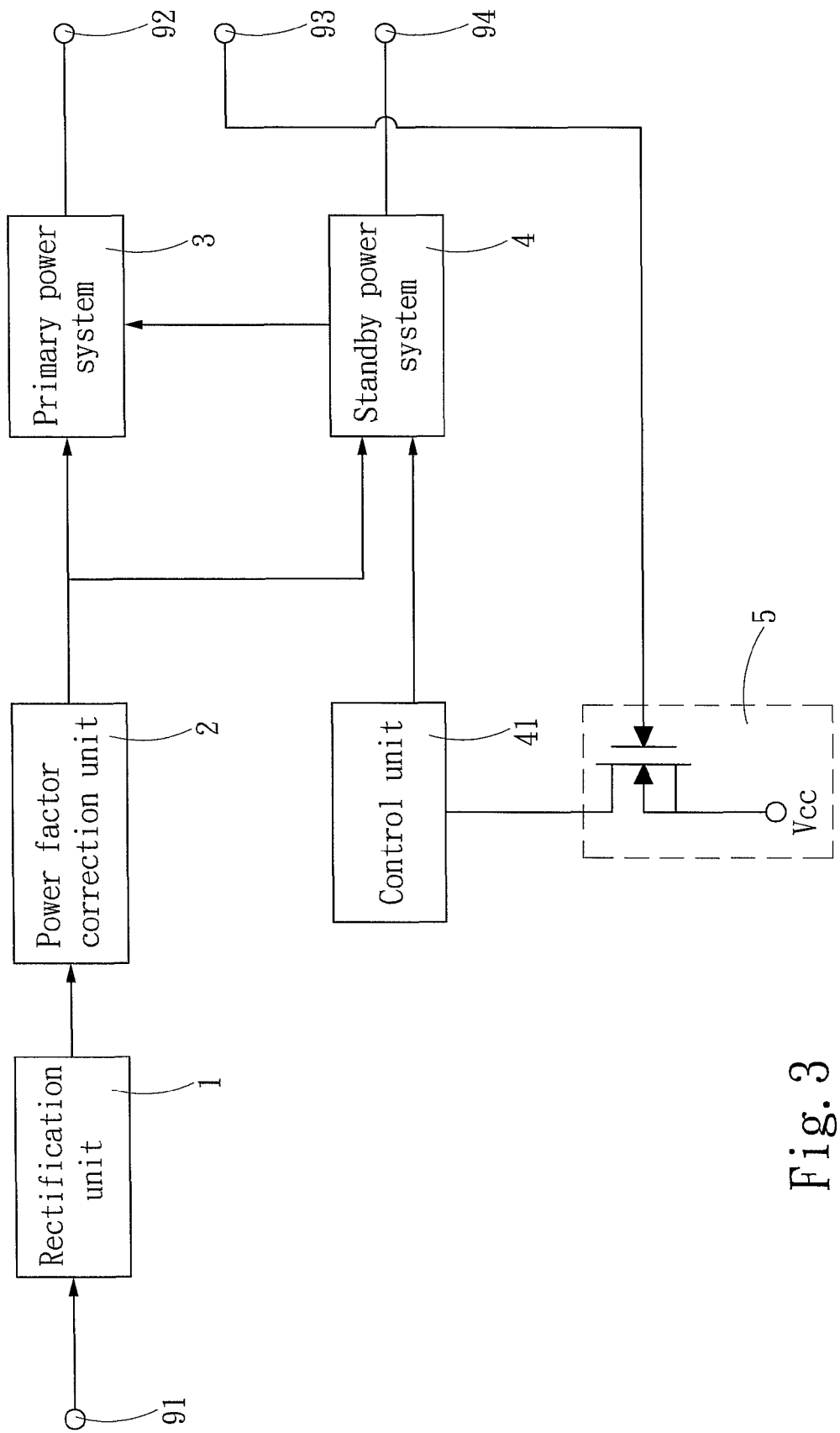
FIG. 3 is a detailed structural block diagram of the invention.

The electric signal generated by the control unit 41 may be a bias power signal or reference frequency signal to drive the standby power system 4. This is a technique known in the art, thus details are omitted herein. As the standby power system 4 is driven by the bias power signal or reference frequency signal, before the start triggering circuit 5 doesn't drive the control unit 41 through the start signal; the standby power system 4 can be treated as shutdown. The circuit to generate the start signal can be formed in various types of embodiments. FIG. 3 illustrates a lower cost embodiment. The remote start/stop signal source 93 is a trigger switch triggered by users to generate a pulse type remote start/stop signal. The pulse type remote start/stop signal is not powerful enough to drive the control unit 41. The start triggering circuit 5 receives the remote start/stop signal and regulates it to become a continuous start signal to drive the control unit 41. The start triggering circuit 5 can be a power source including a switch triggered by the remote start/stop signal to output the start signal. While FIG. 3 illustrates a lower cost embodiment, it does not limit the start triggering circuit 5 from adopting other embodiments. The circuit structure provided by the invention previously discussed can achieve the object of the invention to reduce the loss of the standby power system 4 and improve the problem that the temperature of equipments increases in the standby conditions.

As a conclusion, the invention can reduce loss in the standby conditions and save electric power without generating heat, and also can enhance life span of the power supply.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A power supply consuming low energy in standby conditions having a primary power system and a standby power system electrically connected to the primary power system, comprising:
   a remote start/stop signal source to generate a remote start/stop signal;
   a start triggering circuit to generate a start signal according to the remote start/stop signal; and
   a control unit respectively connecting the standby power system and the start triggering circuit and determining time series of sending an electric signal to the standby power system according to time series of the start signal from the start triggering circuit, wherein the standby power system driven by the electric signal of the control unit to generate a standby power to activate the primary power system.

2. The power supply of claim 1, wherein the electric signal sent by the control unit is a bias power to drive the standby power system to generate the standby power.

3. The power supply of claim 1, wherein the electric signal generated by the control unit is a reference frequency pulse wave referred by the standby power system to generate the standby power.

4. The power supply of claim 1, wherein the remote start/stop signal source is a trigger switch triggered by users to generate a pulse type remote start/stop signal which is received by the start triggering circuit and regulated to become a continuous start signal to drive the control unit.

5. The power supply of claim 4, wherein the start triggering circuit is a power source which includes a switch triggered by the remote start/stop signal to be output.

\* \* \* \* \*